United States Patent — Madhavan et al.
Patent No.: US 8,194,526 B2
Date of Patent: *Jun. 5, 2012

(54) METHOD FOR DATA COMMUNICATION VIA A VOICE CHANNEL OF A WIRELESS COMMUNICATION NETWORK

(75) Inventors: Sethu K. Madhavan, Canton, MI (US); Iqbal M. Surti, Troy, MI (US); Jijun Yin, Los Angeles, CA (US)

(73) Assignee: General Motors LLC, Detroit, MI (US)

(*) Notice: Subject to any disclaimer, the term of this patent is extended or adjusted under 35 U.S.C. 154(b) by 1386 days.

This patent is subject to a terminal disclaimer.

(21) Appl. No.: 11/163,579

(22) Filed: Oct. 24, 2005

(65) Prior Publication Data

US 2007/0092024 A1    Apr. 26, 2007

(51) Int. Cl.
*H04L 27/10* (2006.01)

(52) U.S. Cl. ......... 370/203; 370/310; 375/283; 375/330

(58) Field of Classification Search .............. 370/206, 370/320, 203, 208, 328, 330, 342, 436, 441, 370/479, 215; 375/308, 329, 330; 455/560, 455/561

See application file for complete search history.

(56) References Cited

U.S. PATENT DOCUMENTS

| | | | |
|---|---|---|---|
| 3,731,201 A | 5/1973 | Frisbie | |
| 4,499,339 A | 2/1985 | Richard | |
| 4,601,045 A * | 7/1986 | Lubarsky | 375/260 |
| 4,675,614 A | 6/1987 | Gehrke | |
| 4,928,107 A | 5/1990 | Kuroda | |
| 5,043,736 A | 8/1991 | Darnell et al. | |
| 5,166,924 A * | 11/1992 | Moose | 370/289 |
| 5,223,844 A | 6/1993 | Mansell et al. | |
| 5,235,633 A | 8/1993 | Dennison et al. | |
| 5,365,450 A | 11/1994 | Schuchman et al. | |
| 5,388,147 A | 2/1995 | Grimes | |
| 5,422,816 A | 6/1995 | Sprague et al. | |
| 5,539,810 A | 7/1996 | Kennedy, III et al. | |
| 5,555,286 A | 9/1996 | Tendler | |

(Continued)

FOREIGN PATENT DOCUMENTS

EP    0545783 A1    6/1993

(Continued)

OTHER PUBLICATIONS

Letter of May 15, 2007, from Marc E. Hankin to Anthony Simon (1 page).

(Continued)

*Primary Examiner* — Hassan Kizou
*Assistant Examiner* — Roberta A Shand
(74) *Attorney, Agent, or Firm* — Anthony Luke Simon; Reising Ethington P.C.

(57) ABSTRACT

A system and method for data communication over a cellular communications network that allows the transmission of digital data over a voice channel of the communications network. Digital data is encoded into DBPSK data using differential binary phase shift keying encoding. The DBPSK data is then sent across the cellular network using a vocoder having a linear predictive or other speech compression codec. At the receiving end, the DBPSK data is demodulated back into the original digital data. This approach permits data communication via a CDMA, GSM, or other type of voice traffic channel at a low bit error rate.

20 Claims, 7 Drawing Sheets

U.S. PATENT DOCUMENTS

| | | | |
|---|---|---|---|
| 5,712,899 A | 1/1998 | Pace, II | |
| 5,754,554 A | 5/1998 | Nakahara | |
| 5,786,789 A | 7/1998 | Janky | |
| 5,812,087 A | 9/1998 | Krasner | |
| 5,946,304 A | 8/1999 | Chapman et al. | |
| 5,978,756 A | 11/1999 | Walker et al. | |
| 5,987,068 A * | 11/1999 | Cassia et al. | 375/281 |
| 5,999,125 A | 12/1999 | Kurby | |
| 6,011,806 A * | 1/2000 | Herring | 370/494 |
| 6,049,303 A | 4/2000 | Biacs et al. | |
| 6,070,089 A | 5/2000 | Brophy et al. | |
| 6,091,969 A | 7/2000 | Brophy et al. | |
| 6,108,317 A * | 8/2000 | Jones et al. | 370/320 |
| 6,140,956 A | 10/2000 | Hillman et al. | |
| 6,144,336 A | 11/2000 | Preston et al. | |
| 6,175,801 B1 | 1/2001 | Millington et al. | |
| 6,226,529 B1 | 5/2001 | Bruno et al. | |
| 6,236,652 B1 | 5/2001 | Preston et al. | |
| 6,307,864 B1 * | 10/2001 | Fensch et al. | 370/465 |
| 6,345,251 B1 | 2/2002 | Jansson et al. | |
| 6,363,339 B1 | 3/2002 | Rabipour et al. | |
| 6,366,772 B1 | 4/2002 | Arnson | |
| 6,445,745 B1 * | 9/2002 | Bontu et al. | 375/279 |
| 6,493,338 B1 | 12/2002 | Preston et al. | |
| 6,611,804 B1 | 8/2003 | Dorbecker et al. | |
| 6,614,349 B1 | 9/2003 | Proctor et al. | |
| 6,665,283 B2 * | 12/2003 | Harris et al. | 370/333 |
| 6,681,121 B1 | 1/2004 | Preston et al. | |
| 6,690,681 B1 | 2/2004 | Preston et al. | |
| 6,748,026 B1 | 6/2004 | Murakami et al. | |
| 6,754,265 B1 * | 6/2004 | Lindemann | 375/240 |
| 6,771,629 B1 | 8/2004 | Preston et al. | |
| 6,920,129 B2 | 7/2005 | Preston et al. | |
| 7,151,768 B2 | 12/2006 | Preston et al. | |
| 7,164,662 B2 | 1/2007 | Preston et al. | |
| 7,173,995 B2 | 2/2007 | Karlquist | |
| 7,206,305 B2 | 4/2007 | Preston et al. | |
| 7,239,859 B2 | 7/2007 | Madhavan et al. | |
| 2001/0019592 A1 * | 9/2001 | Solondz | 375/267 |
| 2001/0036174 A1 * | 11/2001 | Herring | 370/352 |
| 2002/0001317 A1 | 1/2002 | Herring | |
| 2002/0097701 A1 | 7/2002 | Lupien et al. | |
| 2002/0111172 A1 | 8/2002 | DeWolf et al. | |
| 2002/0175855 A1 | 11/2002 | Richton et al. | |
| 2002/0177450 A1 | 11/2002 | Vayanos | |
| 2003/0069694 A1 | 4/2003 | Fuchs | |
| 2003/0142646 A1 * | 7/2003 | Paneth et al. | 370/330 |
| 2003/0144836 A1 * | 7/2003 | Kurtz | 704/230 |
| 2003/0225574 A1 | 12/2003 | Matsuura et al. | |
| 2004/0008618 A1 | 1/2004 | Shirakata et al. | |
| 2004/0198378 A1 | 10/2004 | Hay | |
| 2004/0214599 A1 | 10/2004 | Ogino | |
| 2004/0220803 A1 | 11/2004 | Chiu et al. | |
| 2005/0013283 A1 | 1/2005 | Yoon et al. | |
| 2005/0021332 A1 | 1/2005 | Ryu et al. | |
| 2005/0113061 A1 | 5/2005 | Madhavan et al. | |
| 2005/0125152 A1 | 6/2005 | Fuchs et al. | |
| 2005/0143916 A1 | 6/2005 | Kim et al. | |
| 2005/0175113 A1 | 8/2005 | Okuyama | |
| 2005/0182530 A1 | 8/2005 | Murphy | |
| 2006/0224317 A1 | 10/2006 | Sarkar | |
| 2006/0239363 A1 | 10/2006 | Blakeney et al. | |
| 2006/0262875 A1 | 11/2006 | Madhavan | |
| 2006/0280159 A1 | 12/2006 | Bi et al. | |
| 2007/0109185 A1 | 5/2007 | Kracke et al. | |
| 2007/0129077 A1 | 6/2007 | Iguchi et al. | |
| 2007/0135134 A1 | 6/2007 | Patrick | |
| 2007/0190950 A1 | 8/2007 | Madhavan et al. | |
| 2007/0244695 A1 | 10/2007 | Manjunath et al. | |
| 2007/0258398 A1 | 11/2007 | Chesnutt et al. | |
| 2008/0247484 A1 | 10/2008 | Chesnutt et al. | |
| 2008/0255828 A1 | 10/2008 | Chesnutt et al. | |
| 2008/0273644 A1 | 11/2008 | Chesnutt et al. | |
| 2010/0266001 A1 * | 10/2010 | Choi et al. | 375/222 |

FOREIGN PATENT DOCUMENTS

| | | | |
|---|---|---|---|
| WO | WO8912835 A1 | 12/1989 | |

OTHER PUBLICATIONS

Letter of Jun. 25, 2007 from Micah D. Stolowitz to James D. Stevens (2 pages).

Letter of Jun. 20, 2007 from Vernon W. Francissen to Anthony L. Simon (2 pages).

Lin; D., et al. "Data Compression of Voiceband Modem Signals," 40th IEEE Vehicular Technology Conference, May 6-9, 1990, pp. 323-325, Orlando, Florida.

Mueller; Joseph A. "A DSP Implemented Dual 9600/7200 bps TCM Modem for Mobile Communications Over FM Voice Radios," Aug. 20, 1997, IEEE, pp. 758-761.

Speech Coding with Linear Predictive Coding (LPC); www.dspexperts.com/dsp; retrieved Aug. 14, 2005; author unknown; 15 pages.

Phase-shift Keying; retrieved from Wikipedia; Oct. 23, 2005; 13 pages.

Office Action for U.S. Appl. No. 11/554,985, issued Jul. 30, 2009 (16 pages).

* cited by examiner

METHOD FOR DATA COMMUNICATION VIA A VOICE CHANNEL OF A WIRELESS COMMUNICATION NETWORK

TECHNICAL FIELD

The present invention relates generally to data communication over a telecommunications network and, more particularly, to data communication over a telecommunications voice channel such as a CDMA or GSM voice traffic channel.

BACKGROUND OF THE INVENTION

Wired telephone systems were originally designed to carry speech to enable voice conversations over long distances. More recently, public switched telephone systems have become a primary medium for transmitting not only voice, but also non-speech data, such as by use of facsimile machines that transmit image information over the telephone lines, or by modems that exchange digital data of various forms (text, binary executable files, image or video files) over these same phone lines.

Today, cellular and other wireless communication systems are in much greater use for purposes of both voice and data communication. Most cellular communication in use in the world today utilize either the GSM (including UMTS) or CDMA (IS-95 or CDMA2000) communication systems. These systems transmit voice data over a voice traffic channel using a modulated carrier wave. For example, 2 G GSM uses GMSK modulation and IS-95 CDMA uses PSK modulation. Prior to modulating the voice data for wireless transmission, the voice input is run through a speech compression circuit such as a vocoder to compress the voice input into a smaller amount of data. This reduces the amount of voice data that needs to be transmitted via the wireless network, thereby permitting the use of a smaller bit rate and a greater number of users sharing the same communication system.

Various vocoder techniques have been proposed and used. The most common are various forms of linear predictive codings (LPC); for example, 2 G GSM uses a RPE-LPC speech codec, while IS-95 CDMA uses a variable rate CELP codec. These predictive compression techniques are designed specifically for voice encoding and, as such, are designed to filter out noise and other non-speech components. As a result, the transmission of digital data (such as ASCII text, byte codes, binary files) can be problematic since the vocoder processing can corrupt the digital data, making it unrecoverable at the receiving end of the transmission. For example, the recently introduced Qualcomm® 4 G Vocoder is a CDMA2000 device that exhibits a time-varying, non-linear transfer function which, while acceptable for voice encoding, can impose significant distortion when attempting to transmit digital data via the vocoder.

SUMMARY OF THE INVENTION

The present invention provides a method of data communication over a wireless communication network that allows the transmission of digital data over a voice channel of the communications network. In accordance with one embodiment, the method includes the steps of:

(a) generating DPSK data from digital data using differential phase shift keying encoding;

(b) transmitting the DPSK data across a voice channel of a wireless telecommunications network;

(c) receiving the DPSK data transmitted via the wireless telecommunications network; and (d) demodulating the received DPSK data back into the digital data.

Preferably, differential binary phase shift keying encoding is used, although quadrature and other DPSK encoding can be used depending upon the resulting bit error rate for a particular application. The transmission of the DPSK data over the voice channel is preferably carried out using a speech compression circuit that applies a linear predictive codec, although other suitable codecs can be used.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
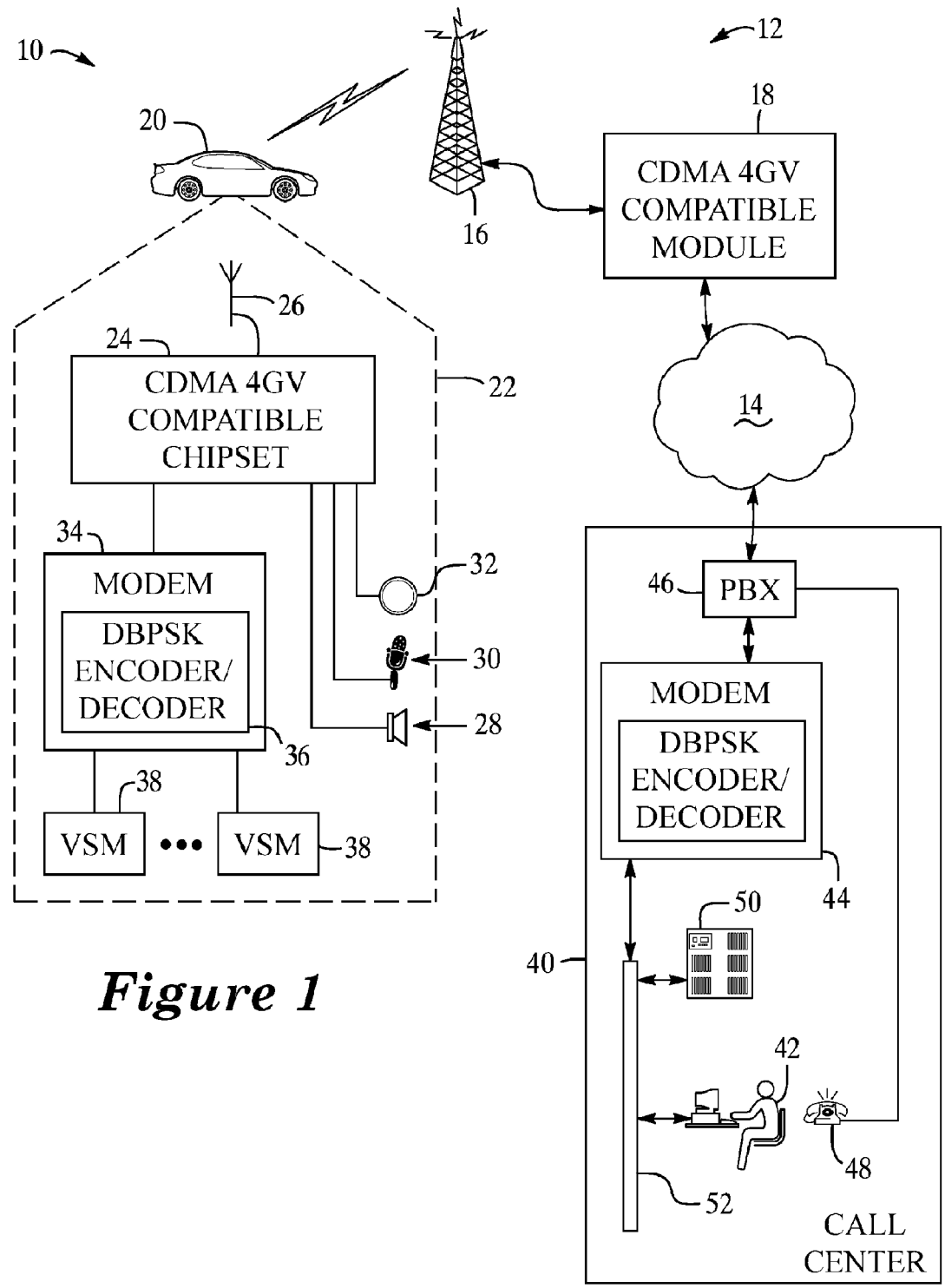
FIG. 1 is a block diagram depicting an electronic communication system constructed in accordance with the invention.

Referring to FIG. 1, there is shown an electronic communication system 10 constructed in accordance with the invention. The communication system 10 includes a conventional cellular communication network having a voice traffic channel that is used for two-way transmission of voice data between cellular telephones. The communication system 10 also includes the ability to utilize the cellular system voice channel to exchange digital data containing information other than speech or other audio. As will be discussed in greater detail below, this data communication is carried out using differential phase shift keying modulation of an audio frequency carrier wave using the digital data. This approach enables data communication via the same voice channel that is used for speech transmission and, with proper selection of carrier frequency and bit rate, permits this data transmission to be accomplished at a bit error rate that is acceptable for most applications.

The communication system 10 includes in general a cellular communication network 12 connected to a public switched telephone system 14 which together are used to provide voice and data communication between a passenger vehicle 20 and a call center 40. Vehicle 20 has an onboard communication system 22 that includes the components normally found in a cellular communication device, such as a CDMA compatible chipset 24 and antenna 26 that enables use of the cellular network 12 to permit a vehicle occupant to carry on voice conversations using a speaker 28 and microphone 30. These components of onboard system 22 can be implemented in a conventional manner, as will be known to those skilled in the art. Apart from the microphone 30 input, onboard system 22 also includes at least one pushbutton 32 that can be used to initiate a voice communication with a live advisor 42 located at the call center 40.

In accordance with 4 G CDMA systems, voice data from both the vehicle occupant (not shown) and the live advisor 42 are encoded using a vocoder to compress the speech prior to wireless transmission over the voice traffic channel via the cell tower 16. Once received over the wireless network, the encoded speech is then decoded by the vocoder for the listener. The vocoder is incorporated into the chipset 24 as well as in a CDMA compatible module 18 located in the base equipment at the cell tower 16. Although various compression codecs can be used, in the illustrated embodiment, the 4 G vocoder is implemented as a time-varying, non-linear filter. Various such codecs are well known using linear predictive techniques; for example, a RPE-LPC codec or a fixed or variable rate CELP codec. Any suitable codec (whether linear predictive or not) can be used in the system 10 of FIG. 1.

In addition to the typical voice data transmission over the voice traffic channel, the communication system 10 enables data communication via this same voice traffic channel and through the vocoder 18, 24. This is accomplished using a modem on either side of the vocoder; that is, using a first modem 34 incorporated into the onboard vehicle communication system 22 and a second modem 44 located at the call center 40. These modems can have the same construction and operation so that only modem 34 will be described, and it will be appreciated that the description of modem 34 applies equally to modem 44. As shown in FIG. 1, the modem 34 is connected to the CDMA 4 GV chipset 24 which can be designed to switch or multiplex between the modem 34 and the telephony devices 28-32 so that the cellular communication network 12 can be used for either voice or data communication, or both, even during the same call.

Regardless of whether the cellular call is initiated at the vehicle 20 or call center 40, the transmitting modem can use a predefined tone or series of tones to alert the receiving modem of the requested data transmission, and the various attributes of the data connection can then be negotiated by the two modems. To enable data communication over the voice channel, the modem applies a differential phase shift keying (DPSK) encoding to convert the digital data being transmitted into DPSK data that can be successfully sent via the vocoder 18, 24 and over the voice traffic channel of the cellular network 12. In the illustrated embodiment, a particular form of DPSK encoding is used; namely, differential binary phase shift keying (DBPSK) modulation which is provided by a DBPSK encoder/decoder 36. This and other forms of DPSK will be discussed farther below.

On the vehicle 20, the digital data being DBPSK encoded and sent via modem 34 can be obtained from one or more vehicle system modules (VSMs) 38. These modules 38 can be any vehicle system for which information transmission is desired to or from the call center 40 or other remote device or computer system. For example, one VSM 38 can be a diagnostic system that provides diagnostic trouble codes or other diagnostic information to the call center 40. As another example, VSM 38 can be a GPS-enabled navigation system that uploads coordinates or other such information concerning the vehicle's location to the call center. Data can be transmitted from the call center (or other remote device or computer system) to the vehicle as well. For example, where VSM 38 is a navigation system, new maps or other directional or point of interest information can be downloaded to the vehicle. As another example, a VSM 38 can be an infotainment system in which new music or videos can be downloaded and stored for later playback. Furthermore, the term "digital data" as used herein includes not only information, but also executable code such that new programming can be downloaded to the vehicle via the voice traffic channel from a server or other computer. Those skilled in the art will know of other such VSMs 38 and other types of digital data for which communication to and/or from the vehicle 20 is desired.

Call center 40 includes not only the live advisor 42 and modem 44, but also several other components. It includes a PBX switch 46 to route incoming calls either to one or more telephones 48 for voice communication or to modem 44 for data transmission. The modem 44 itself can be connected to various devices such as a server 50 that provides information services and data storage, as well as a computer used by the live advisor 42. These devices can either be connected to the modem 44 via a network 52 or alternatively, can be connected to a specific computer on which the modem 44 is located. The various components of FIG. 1 include some that are conventional and others that can be implemented based upon the description contained herein and the knowledge possessed by one skilled in the art. For example, although the modems 34, 44 and their DBPSK encoder/decoder are not conventional components, techniques for implementing DBSPK encoding and decoding are known and can be implemented by those skilled in the art using such components as DSPs and ASICs. Similarly, the other features needed to implement the modems 34, 44 are all well known to those skilled in the art.

Figure 2:
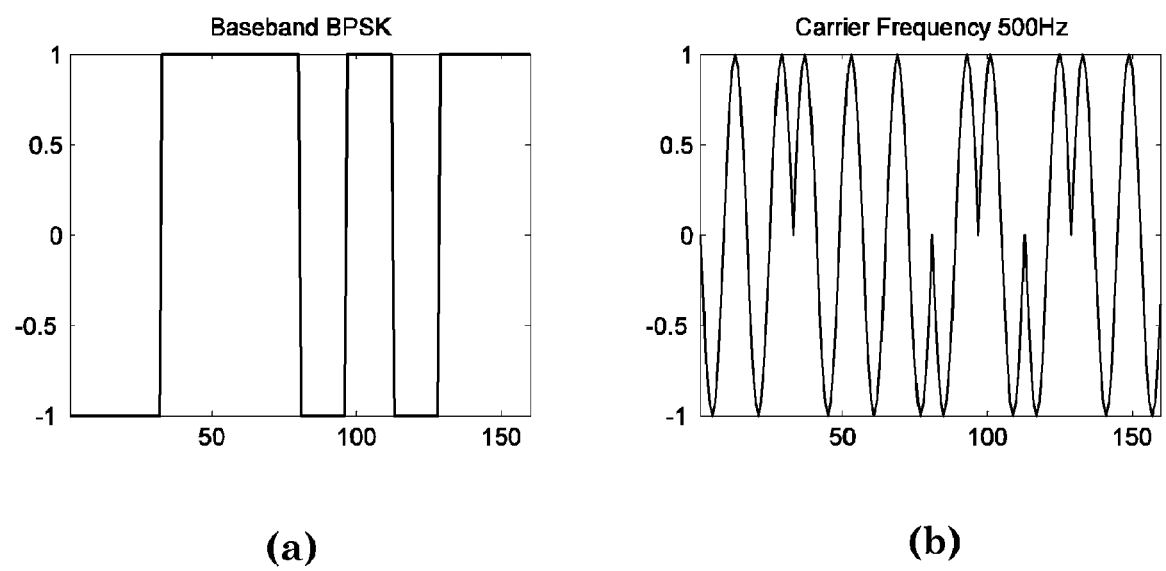
FIG. 2 is a pair of plots showing BPSK encoding of a CDMA data frame at a bit rate of 10 bits/frame.
Figure 3:
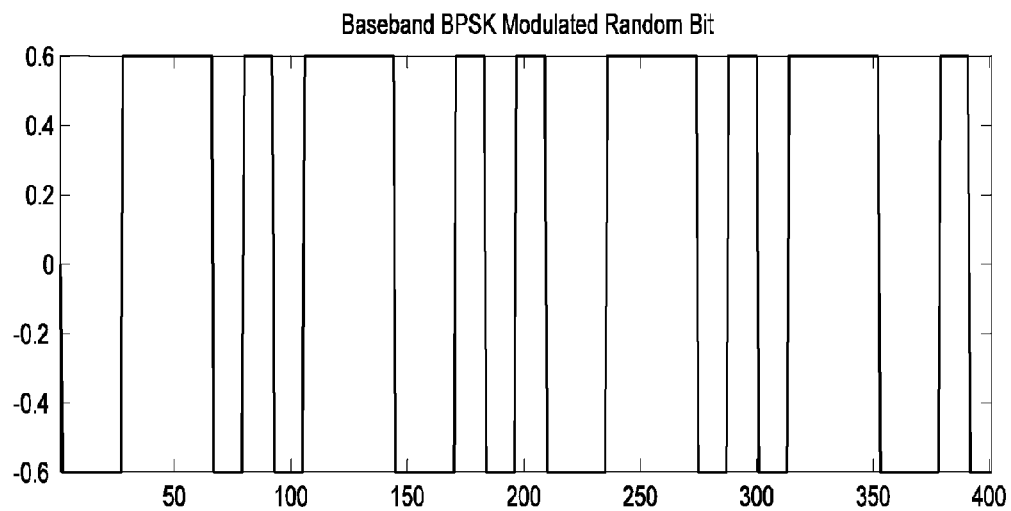
FIG. 3 a plot of a BPSK baseband as in FIG. 2, but at a bit rate of 12 bits/frame.
Figure 4:
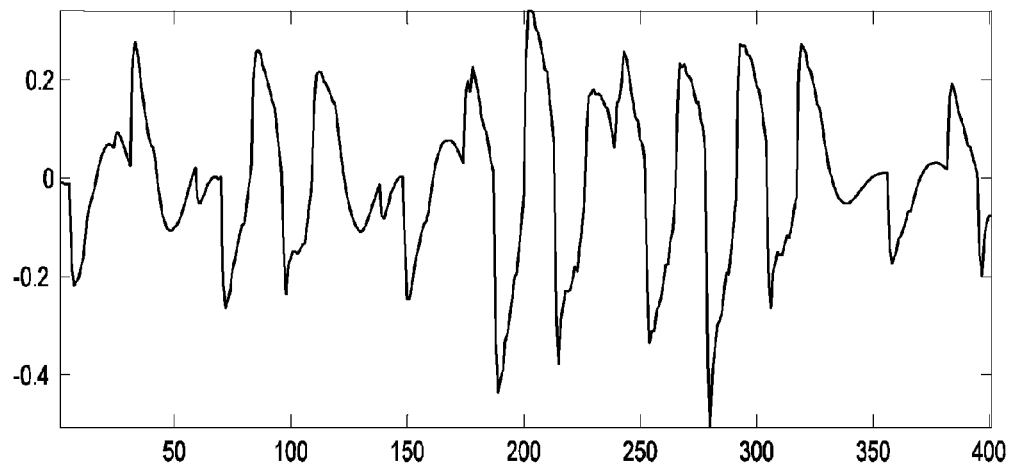
FIG. 4 depicts a sample vocoder output using the BPSK waveform of FIG. 3.

Turning now to FIGS. 2-11, various phase shift keying approaches and results will be described. Because the vocoder used for cellular communication filters out frequencies above that needed for speech transmission, successful data transmission over the cellular voice traffic channel is limited to using frequencies at or below several kilohertz. Thus, where data modulation techniques are to be used, the carrier frequency should be limited to those within this upper frequency. FIG. 2 includes two plots of a random bit pattern used for binary phase shift keying (BPSK) modulation, the first plot (a) being the baseband BPSK representing the random 0011101011 bit pattern, and the second plot (b) being of a 500 Hz carrier frequency modulated with the bit pattern using BPSK. For a sampling rate of 160 samples at an 8 kHz sampling frequency, these ten bits represent a typical 20 ms frame of data, such as is used in CDMA. For comparison, FIG. 3 is a similar BPSK baseband waveform, but at a bit rate of 12 bits/frame, with the waveform depicting two and a half frames of data. This same FIG. 3 waveform is shown in FIG. 4 after it has been sent through the vocoder without first being used to modulate an audio frequency carrier. The filtering carried out by the vocoder makes the digital data unrecoverable from the (FIG. 4) output of the vocoder. Where BPSK modulation of a 500 Hz carrier frequency is used (FIG. 5), the resulting output of the vocoder (FIG. 6) does retain to at least some extent the original data.

Figure 5:
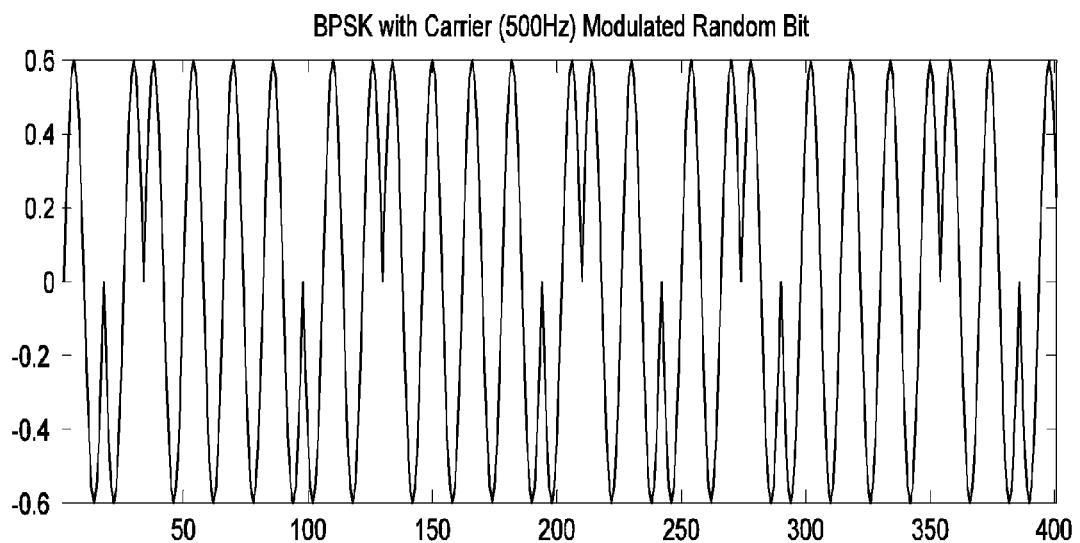
FIG. 5 depicts a 500 Hz carrier modulated by BPSK using a random bit pattern at 10 bits/frame.

Looking at FIG. 5 in greater detail, the modulated 500 Hz waveform of FIG. 5 is at a bit rate of 10 bits/frame using the following random bit pattern:

0100001100001001101111001.

Figure 6:
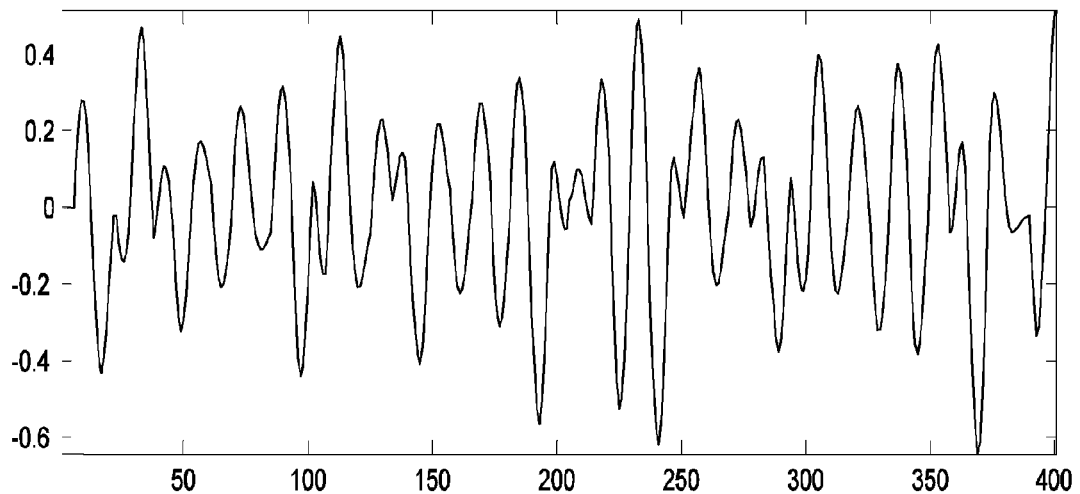
FIG. 6 is a sample vocoder output using the BPSK waveform of FIG. 5.
Figure 7:
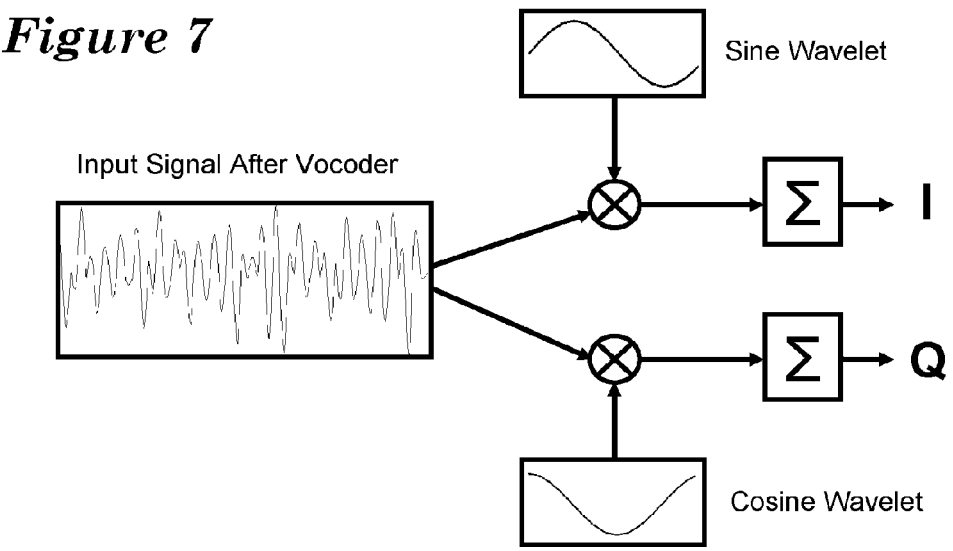
FIG. 7 is a block diagram of a BPSK demodulator.
Figure 8:
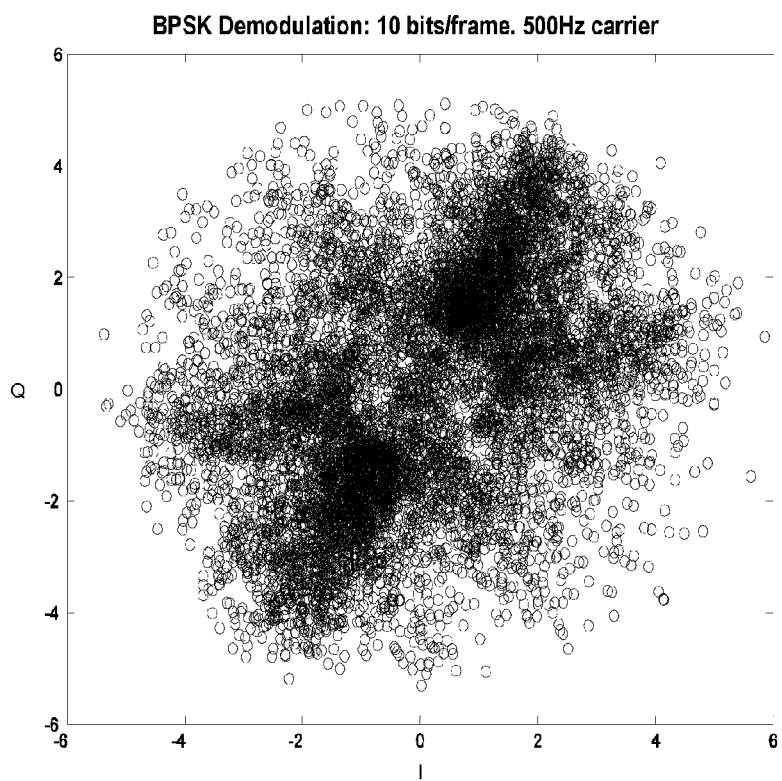
FIG. 8 is a constellation plot of sample BPSK demodulated data.

The resulting vocoder output of FIG. 6 can then be decoded by extracting the phase information to resolve the waveform back into the original digital data. This can be done in a known manner such as is shown in FIG. 7 in which the vocoder waveform is multiplied by a sine waveform and the result summed to get I-axis data points, and is also separately multiplied by a cosine waveform to get Q-axis information. Digital processing techniques for decomposing the vocoder waveform according to FIG. 7 and generating from it the resulting bit pattern is well known to those skilled in the art. A sample constellation plot of sample bit patterns run through the vocoder using BPSK is shown in FIG. 8. As this constellation diagram shows, the use of BPSK through the vocoder does not do well in retaining the original digital data and, as a result, has a bit error rate (BER) that is unacceptably high for most applications. The loss of information using the BPSK appears to be the result of the non-linear, time-varying attributes of the vocoder which can introduce phase drifts in the signal passing through the vocoder.

Figure 9:
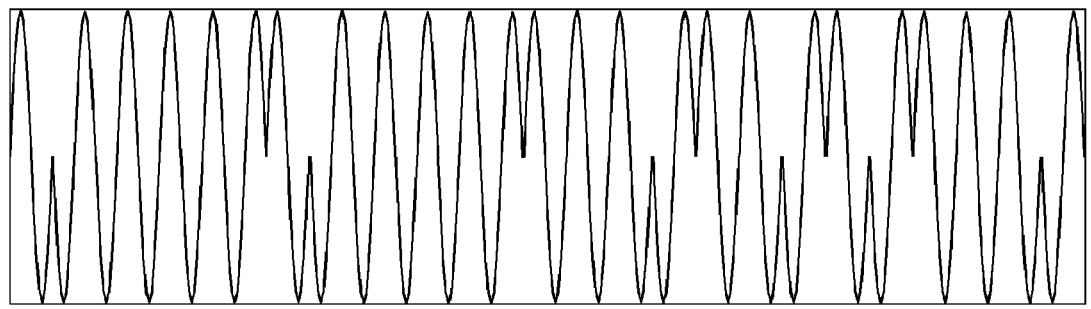
FIG. 9 is a 500 Hz carrier modulated by DBPSK using a random bit pattern at 10 bits/frame.
Figure 10:
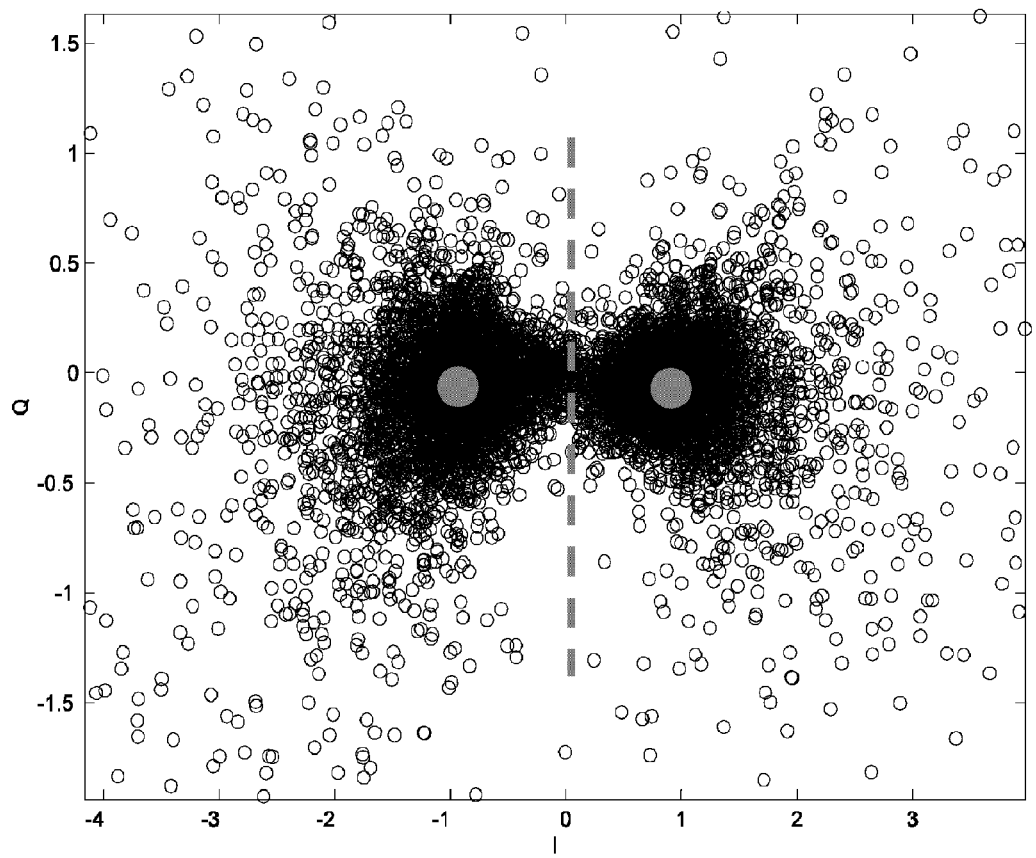
FIG. 10 depicts a constellation plot of the sample DBPSK demodulated data of FIG. 9.

Thus, in accordance with the disclosed embodiment of the invention, differential phase shift keying (DPSK) is employed to avoid the phase problems introduced by the vocoder. The DPSK modulates the carrier in accordance with the difference between successive information bits in the bit pattern and, in doing so, eliminates the problems caused by random phase drifts. Preferably, differential binary phase shift keying (DBPSK) is used, an example of which is shown in FIGS. 9 and 10. In FIG. 9, the same bit pattern from FIG. 5 is again used, but this time is used to modulate the 500 Hz carrier using DBPSK. FIG. 10 shows the constellation diagram for the decomposed vocoder output after it has been subjected to DBPSK decoding. As this plot shows, the results of demodulation are highly differentiated along the I-axis with the zeros and ones of the bit pattern centralized around two nodes on either side of the Q-axis line extending through the origin. Thus, the original digital data can be recovered with a relatively low bit error rate. Sample data using DBPSK such as is shown in FIG. 9 was tested using a Qualcomm® 4G vocoder running in different operating modes. The bit error rate of the sample data using a carrier frequency of 500 Hz and 500 bits/sec (10 bits/frame) was about 1.5%. Other combinations of frequencies and bit rates (bits/frame) can be used as long the resulting bit error rate is acceptable for the particular application involved. Furthermore, different vocoder designs (which often use different speech compression codecs) may require the use of a different carrier frequency or different combination of carrier frequency and bit rate to achieve an acceptable bit error rate. For any particular vocoder design, the appropriate frequency and bit rate can be determined by testing the vocoder using sample waveforms. In general, any carrier frequency of 4,000 Hz or less (down to about 1 Hz) is preferably used, and more preferably the carrier frequency is within the range of 400 Hz to 2,500 Hz. Apart from the carrier frequency, the bite rate can be selected not just to achieve a low bit error rate, but also as necessary or desired for a particular application. Preferably, the digital data has a bit rate of 250 to 3,000 bits/sec. When selecting a particular carrier frequency and bit rate, the modulated carrier should be examined at any of the possible operational modes of the vocoder to insure that the bit error rate is acceptable for the intended application.

Figure 11:
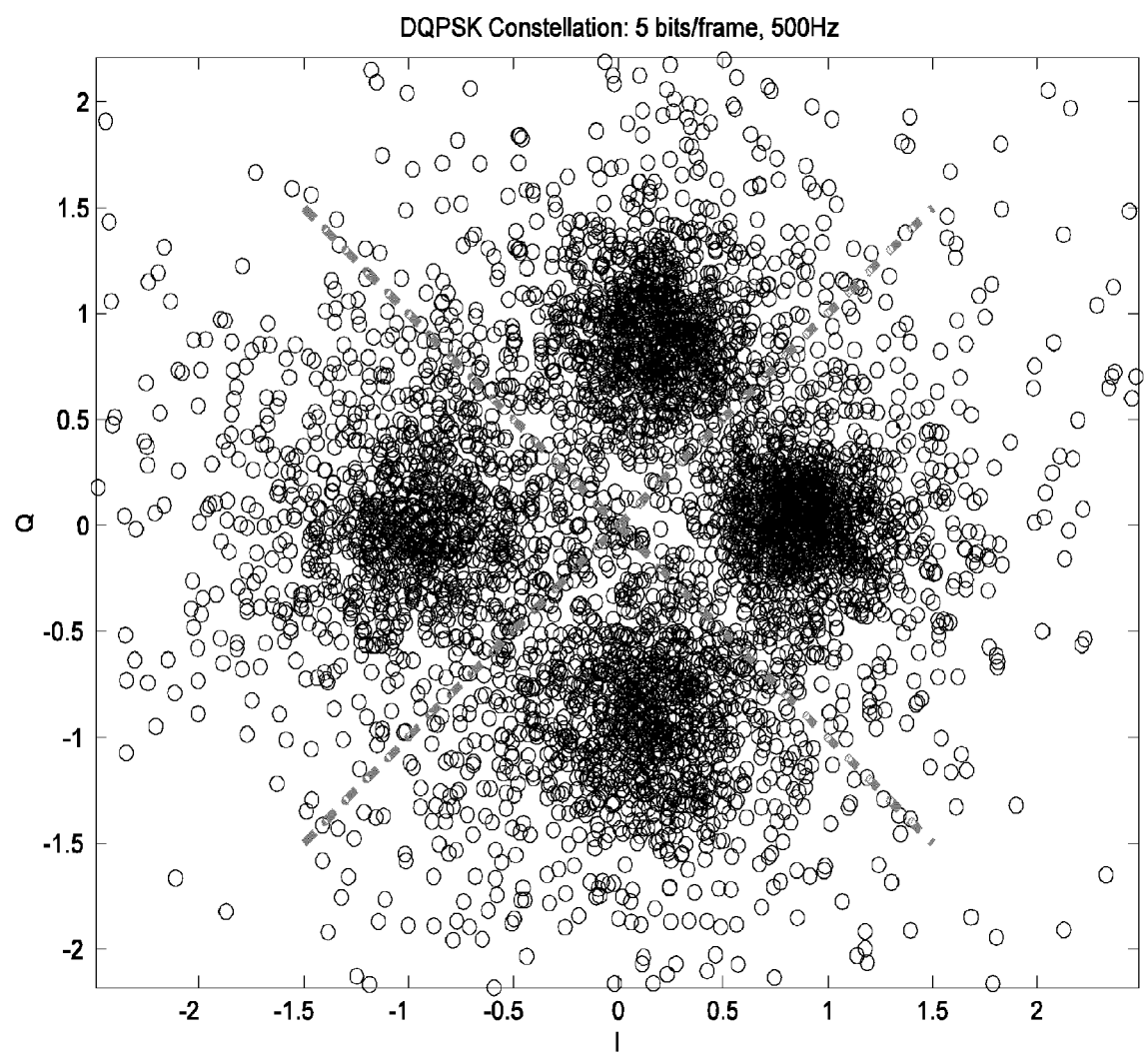
FIG. 11 depicts a constellation plot of sample DQPSK demodulated data.

Apart from DBPSK, other forms of differential phase shift keying modulation can be used as long as they result in a suitable bit error rate for the particular vocoder involved. For example, FIG. 11 depicts a constellation plot for differential quadrature phase shift keying (DQPSK) using 5 bits/frame and a 500 Hz carrier. As can be seen from this plot, there is a higher bit error rate. Testing of the Qualcomm® 4 G vocoder noted above at the same 500 Hz, 10 bits/frame input that was used for the DBPSK testing showed a bit error rate of about 6% at all three operating modes of the vocoder. Although this quadrature approach has demonstrated a higher bit error rate than DBPSK, it can nonetheless be used in applications where the higher bit error rate can be tolerated.

Referring back momentarily to FIG. 1, it will thus be apparent that, in accordance with one embodiment of the method of the present invention, digital data can be communicated via the wireless network by:

(a) generating DPSK data from digital data using differential phase shift keying encoding;

(b) transmitting the DPSK data across a voice channel of a wireless telecommunications network;

(c) receiving the DPSK data transmitted via the wireless telecommunications network; and (d) demodulating the received DPSK data back into the digital data.

In an example where data is being transmitted from the vehicle 20 to the call center 40, step (a) can be carried out by the modem 34 using digital data received from one of the vehicle system modules 38. Step (b) in this example can be accomplished by first using the CDMA 4 GV chipset 24 to encode the DBPSK data from the modem 34, and this can be done using a linear predictive codec of the type that exhibits a time-varying, non-liner transfer function that at least partially filters out non-speech components of the inputted data. The encoded output can then be transmitted over the cellular network 12 via the vehicle antenna 26. Step (c) of this example then involves receiving the DBPSK data at the call center 40 after it has been through a voice decoder within the CDMA 4 GV module 18. Finally, step (d) involves decoding the DBPSK data back into the original digital data from the VSM 38. Again, although DPSK using binary encoding is shown in FIG. 1, quadrature or other any other suitable number of encoding bits can be used.

It is to be understood that the foregoing description is not a definition of the invention itself, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example" and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of communicating digital data via a wireless telecommunications network, comprising the steps of:
   generating DPSK data from digital data using differential phase shift keying encoding;
   transmitting the DPSK data via a vocoder across a voice channel of a wireless telecommunications network;
   receiving the DPSK data transmitted via the wireless telecommunications network; and
   demodulating the received DPSK data back into the digital data.

2. The method of claim 1, wherein the generating step further comprises generating the DPSK data as DBPSK data using differential binary phase shift keying encoding.

3. The method of claim 2, wherein the transmitting step further comprises obtaining vocoder output data by sending the DBPSK data through the vocoder and thereafter transmitting the vocoder output data via the voice channel.

4. The method of claim 3, wherein the receiving step further comprises converting the received output data into decoded DBPSK data by sending the received output data through a voice decoder.

5. The method of claim 4, wherein the demodulating step further comprises decoding the DBPSK data back into the digital data.

6. The method of claim 3, wherein said step of obtaining vocoder output data comprises the step of inputting the DBPSK data into a speech compression circuit that exhibits a time-varying, non-linear transfer function and that at least partially filters out non-speech components of the inputted data.

7. The method of claim 2, wherein said generating step further comprises encoding the digital data using differential binary phase shift keying encoding at a carrier frequency within the range of 1 Hz to 4,000 Hz.

8. The method of claim 7, wherein said generating step further comprises encoding the digital data at a bit rate within the range of 250 bits/sec to 3,000 bits/sec.

9. The method of claim 2, wherein said generating step further comprises encoding the digital data using differential binary phase shift keying encoding at a carrier frequency within the range of 400 Hz to 2,500 Hz.

10. The method of claim 2, wherein said generating step further comprises encoding the digital data using differential binary phase shift keying encoding at a carrier frequency of 500 Hz and at a bit rate of 500 bits/sec.

11. A method of transmitting digital data via a wireless telecommunications network that includes a time-varying, non-linear speech compression circuit, the method comprising the steps of:
  modulating digital data using differential binary phase shift keying;
  inputting the modulated digital data into a speech compression circuit that exhibits a time-varying, non-linear transfer function and that at least partially filters out non-speech components of the inputted data;
  obtaining an encoded output from the speech compression circuit; and
  transmitting the encoded output via an antenna.

12. A method of encoding digital data for transmission via a voice traffic channel of a wireless telecommunications network, comprising the steps of:
  generating DPSK data by encoding digital data using differential phase shift keying encoding; and
  applying a linear predictive coding to the DPSK data.

13. The method of claim 12, wherein said generating step further comprises encoding the digital data using differential binary phase shift keying encoding at a carrier frequency within the range of 1 Hz to 4,000 Hz.

14. The method of claim 13, wherein said generating step further comprises encoding the digital data at a bit rate within the range of 250 bits/sec to 3,000 bits/sec.

15. The method of claim 12, wherein said generating step further comprises encoding the digital data using differential binary phase shift keying encoding at a carrier frequency within the range of 400 Hz to 2,500 Hz.

16. The method of claim 12, wherein said generating step further comprises encoding the digital data using differential binary phase shift keying encoding at a carrier frequency of 500 Hz and at a bit rate of 500 bits/sec.

17. The method of claim 12, wherein said applying step further comprises encoding the DPSK data with an RPE-LPC codec.

18. The method of claim 12, wherein said applying step further comprises encoding the DPSK data with a CELP codec.

19. The method of claim 18, wherein said CELP codec is a variable rate CELP codec.

20. The method of claim 12, wherein said applying step further comprising encoding the DPSK data with a speech compression circuit that exhibits a time-varying, non-linear transfer function and that at least partially filters out non-speech components of the inputted data.

* * * * *